US012645260B2

(12) United States Patent
Wu et al.

(10) Patent No.: US 12,645,260 B2
(45) Date of Patent: Jun. 2, 2026

(54) ROLLABLE ELECTRONIC DEVICE

(71) Applicant: Innolux Corporation, Miaoli County (TW)

(72) Inventors: Yuan-Lin Wu, Miaoli County (TW); Tsung-Han Tsai, Miaoli County (TW); Kuan-Feng Lee, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 7 days.

(21) Appl. No.: 18/810,542

(22) Filed: Aug. 21, 2024

(65) Prior Publication Data

US 2025/0103101 A1     Mar. 27, 2025

(30) Foreign Application Priority Data

Sep. 25, 2023    (CN) .......................... 202311242602.3

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC .............................. G06F 1/1652; G06F 1/1656
See application file for complete search history.

(56) References Cited

U.S. PATENT DOCUMENTS

| | | | |
|---|---|---|---|
| 10,347,702 B2 * | 7/2019 | Youn .................. | H10D 30/6704 |
| 10,374,023 B2 | 8/2019 | Kimura et al. | |
| 10,993,337 B2 | 4/2021 | Shin et al. | |
| 2021/0327912 A1 * | 10/2021 | Hu ........................ | H10D 86/411 |
| 2022/0036772 A1 * | 2/2022 | Wu ........................ | G06F 1/1601 |
| 2022/0189348 A1 * | 6/2022 | Wu ........................ | G06F 1/1641 |
| 2022/0201879 A1 * | 6/2022 | Kwak .................. | H05K 5/0217 |
| 2023/0371308 A1 * | 11/2023 | Choi ...................... | G06F 1/1641 |
| 2023/0376070 A1 * | 11/2023 | Ju ........................... | G06F 1/1637 |
| 2024/0032340 A1 * | 1/2024 | Kim ...................... | H10K 59/131 |
| 2024/0155934 A1 * | 5/2024 | Choi .................. | H10K 59/1213 |
| 2024/0241545 A1 * | 7/2024 | Kim .................... | H01L 25/0753 |
| 2025/0280709 A1 * | 9/2025 | Song ...................... | H10K 59/38 |

* cited by examiner

*Primary Examiner* — Christopher E Leiby
(74) *Attorney, Agent, or Firm* — JCIPRNET

(57)    ABSTRACT

A rollable electronic device with a rollable axis includes a base layer, an insulating layer, and one or more electronic units. The insulating layer is disposed on the base layer and includes a plurality of first trenches. The first trenches have a first longitudinal direction parallel to the rollable axis. The one or more electronic units are disposed on the insulating layer. In a top view, at least one of the electronic units is disposed between two adjacent first trenches of the first trenches, and the two adjacent first trenches are overlapped with each other along a direction perpendicular to the first longitudinal direction.

19 Claims, 13 Drawing Sheets

ROLLABLE ELECTRONIC DEVICE

CROSS-REFERENCE TO RELATED APPLICATION

This application claims the priority benefit of China application serial no. 202311242602.3, filed on Sep. 25, 2023. The entirety of the above-mentioned patent application is hereby incorporated by reference herein and made a part of this specification.

BACKGROUND

Technical Field

The disclosure relates to an electronic device, in particular to a rollable electronic device which can reduce the probability of cracks or damage during extending.

Description of Related Art

Electronic devices or spliced electronic devices have been widely used in different fields such as communication, display, automotive, or aviation. With the rapid development of the electronic devices, the electronic devices are being developed toward thin and light weights. Therefore, the requirements for reliability or quality of the electronic devices are high.

SUMMARY

The disclosure provides a rollable electronic device which can reduce the probability of cracks or damage during extending.

According to an embodiment of the disclosure, the rollable electronic device includes a base layer, an insulating layer, and one or more electronic units. The insulating layer is disposed on the base layer and includes a plurality of first trenches. The plurality of first trenches have a first longitudinal direction parallel to a rollable axis. The one or more electronic units are disposed on the insulating layer. In a top view, at least one of the electronic units is disposed between two adjacent first trenches of the plurality of first trenches, and the two adjacent first trenches are overlapped with each other along a direction perpendicular to the first longitudinal direction.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
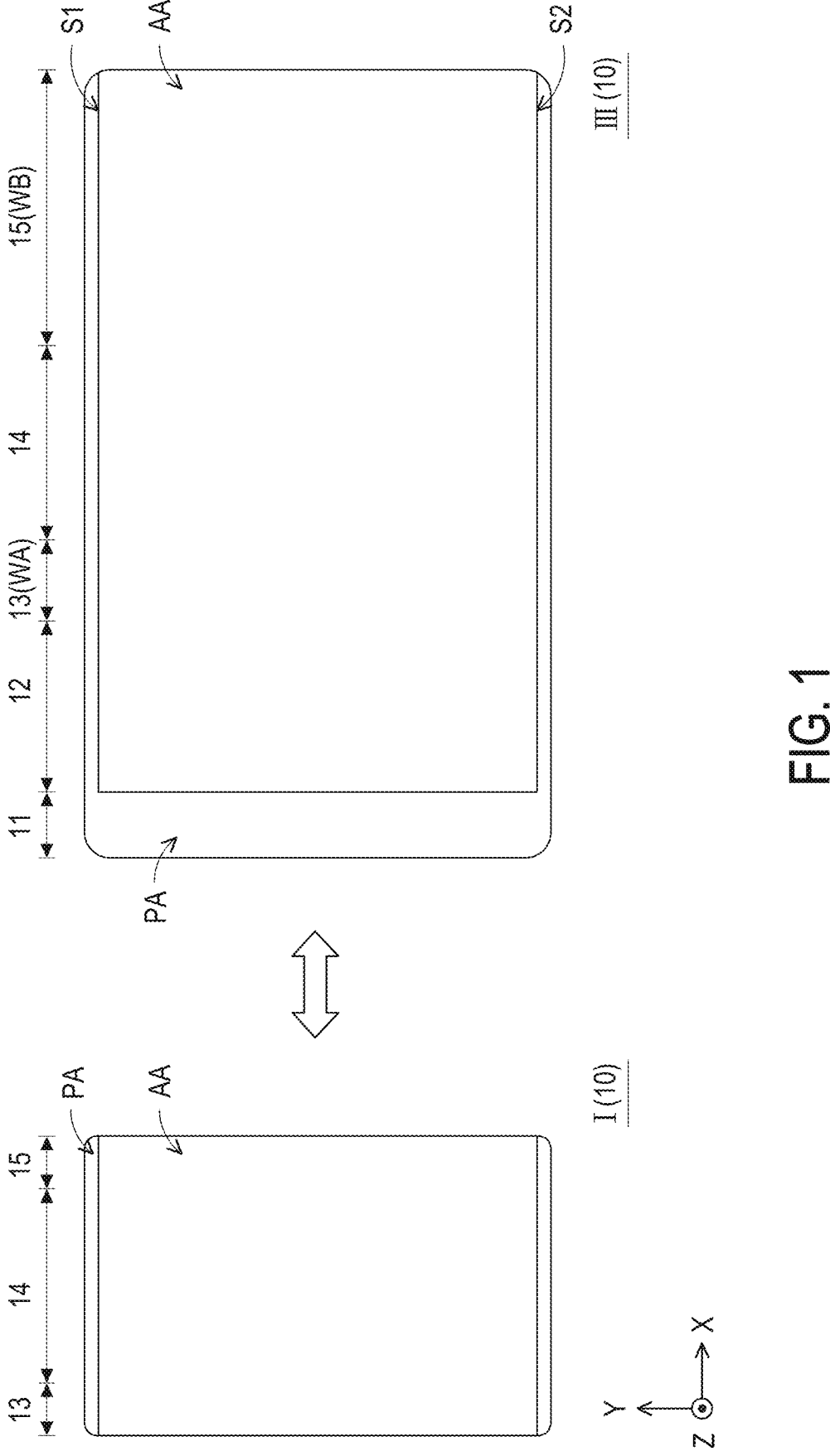
FIG. 1 is a schematic top view of a rollable electronic device in different states according to the first embodiment of the disclosure.

The disclosure may be understood by referring to the following detailed description along with the accompanying drawings. It should be noted that, in order to make the readers easy to understand and for the simplicity of the drawings, several drawings in the disclosure merely depict a portion of an electronic device, and certain elements in the drawings are not drawn to the actual scale. In addition, the quantity and size of each element in the drawings are merely for illustration and are not used to limit the scope of the disclosure.

In the following specification and appended claims, words such as "including" and "comprising" are open-ended words and should be interpreted to mean "including but not limited to . . . ".

It should be understood that, when an element or layer is said to be "on" or "connected to" another element or layer, the element or layer may be directly on or directly connected to the other element or layer, or, there is an interposing element or layer between the two elements or layers (the indirect scenario). In contrast, when an element is referred to as being "directly on" or "directly connected to" another element or layer, there is no interposing element or layer between the two elements or layers.

Although terms such as "first", "second", "third" . . . may be used to describe various component elements, the component elements are not limited to the terms. The terms are merely used to distinguish a single component element from other component elements in the specification. The same terms may not be used in the claims, but be replaced by first, second, third . . . according to the order in which the elements are claimed in the claims. Therefore, in the following specification, the first component element may be the second component element in the claims.

In the description, the terms "about", "approximately", "substantially", and "roughly" are generally interpreted as being within 10%, or within 5%, or within 3%, or within 2%, or within 1%, or within 0.5% of a given value or range. The quantities given here are approximate quantities, that is, without specifically stating "about", "approximately", "substantially", and "roughly", the meaning of "about", "approximately", "substantially", and "roughly" may still implied.

In some embodiments of the disclosure, terms related to bonding and connecting, such as "connection", "interconnection", unless otherwise defined, may mean that two structures are in direct contact, or may also mean that two structures are not in direct contact, in which other structures are disposed between the two structures. Also, the terms related to bonding and connecting may also include the situation where both structures are movable, or both structures are fixed. In addition, the term "coupling" includes any direct and indirect means of electrical connection.

In some embodiments of the disclosure, the optical microscopy (OM), the scanning electron microscope (SEM), the $\alpha$-step, the ellipsometer, or other suitable methods may be used to measure the area, width, thickness, or height of each element or the distance or spacing between elements. In detail, according to some embodiments, the scanning electron microscope may be used to obtain a cross-section structural image including elements to be measured, and the area, width, thickness, or height of each element or the distance or spacing between the elements are measured.

The electronic device of the disclosure may include a display device, an antenna device, a communication device, a sensing device, or a splicing device, but is not limited thereto. The electronic device may be a bendable or flexible electronic device. The electronic device may include, for example, a liquid crystal light-emitting diode. The light-emitting diode may include, for example, an organic light-emitting diode (OLED), a mini LED, a micro LED, or a quantum dot light-emitting diode (QD, which may be, for example, QLED, QDLED), fluorescence, phosphor, or other suitable materials, and the materials may be arranged and combined in any way, but are not limited thereto. The antenna device may be, for example, a phased array antenna, but not limited thereto. The splicing device may be, for example, a display splicing device or an antenna splicing device, but not limited thereto. It should be noted that, the electronic device may be arrangements and combinations of any of the above-mentioned, but not limited thereto. In the following description, the disclosure will be described by using the electronic device, but the disclosure is not limited thereto.

It should be noted that, in the embodiments listed below, features in several different embodiments may be replaced, reorganized, or mixed to complete other embodiments without departing from the spirit of the disclosure. Features in various embodiments may be mixed and matched in any way as long as the features do not violate the spirit of the disclosure or conflict with each other.

Reference will now be made in detail to the exemplary embodiments of the disclosure, and the examples of the exemplary embodiments are illustrated in the accompanying drawings. Whenever possible, the same reference numerals are used in the drawings and descriptions to refer to the same or like parts.

Figure 2:
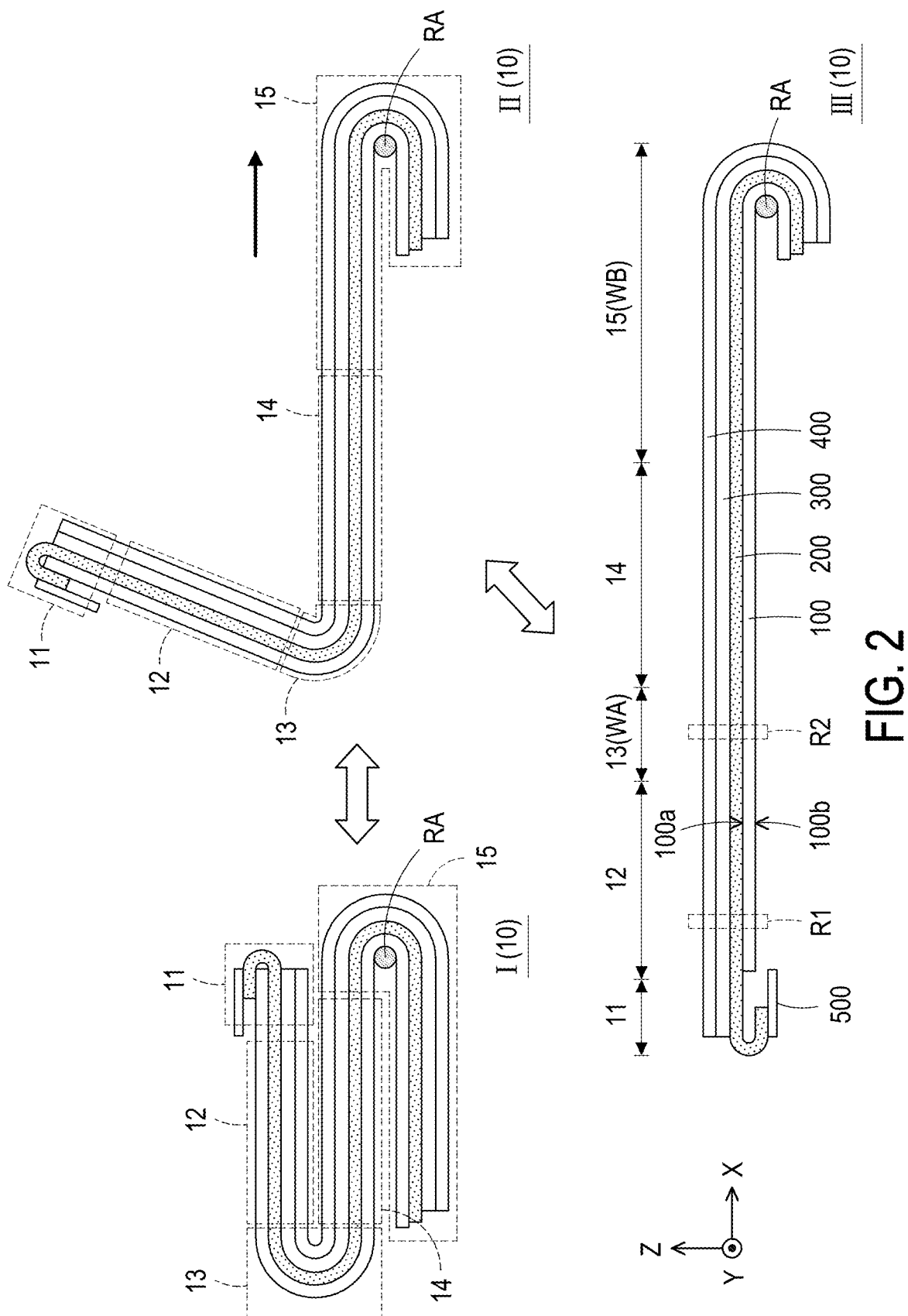
FIG. 2 is a schematic cross-sectional view of the rollable electronic device in FIG. 1 in the different states.
Figure 3:
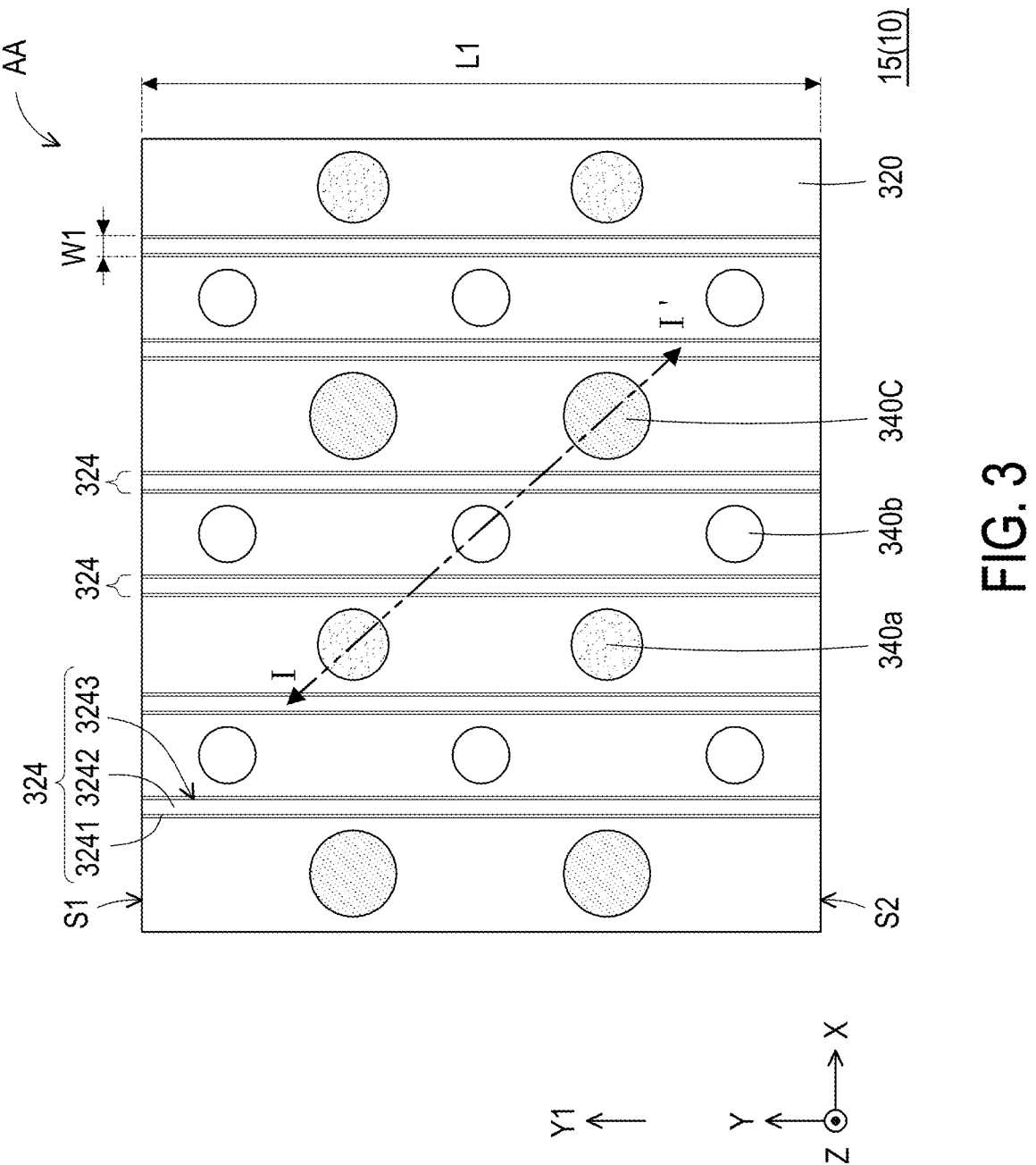
FIG. 3 is a partial top view of a rollable region of the rollable electronic device in FIG. 1.
Figure 4:
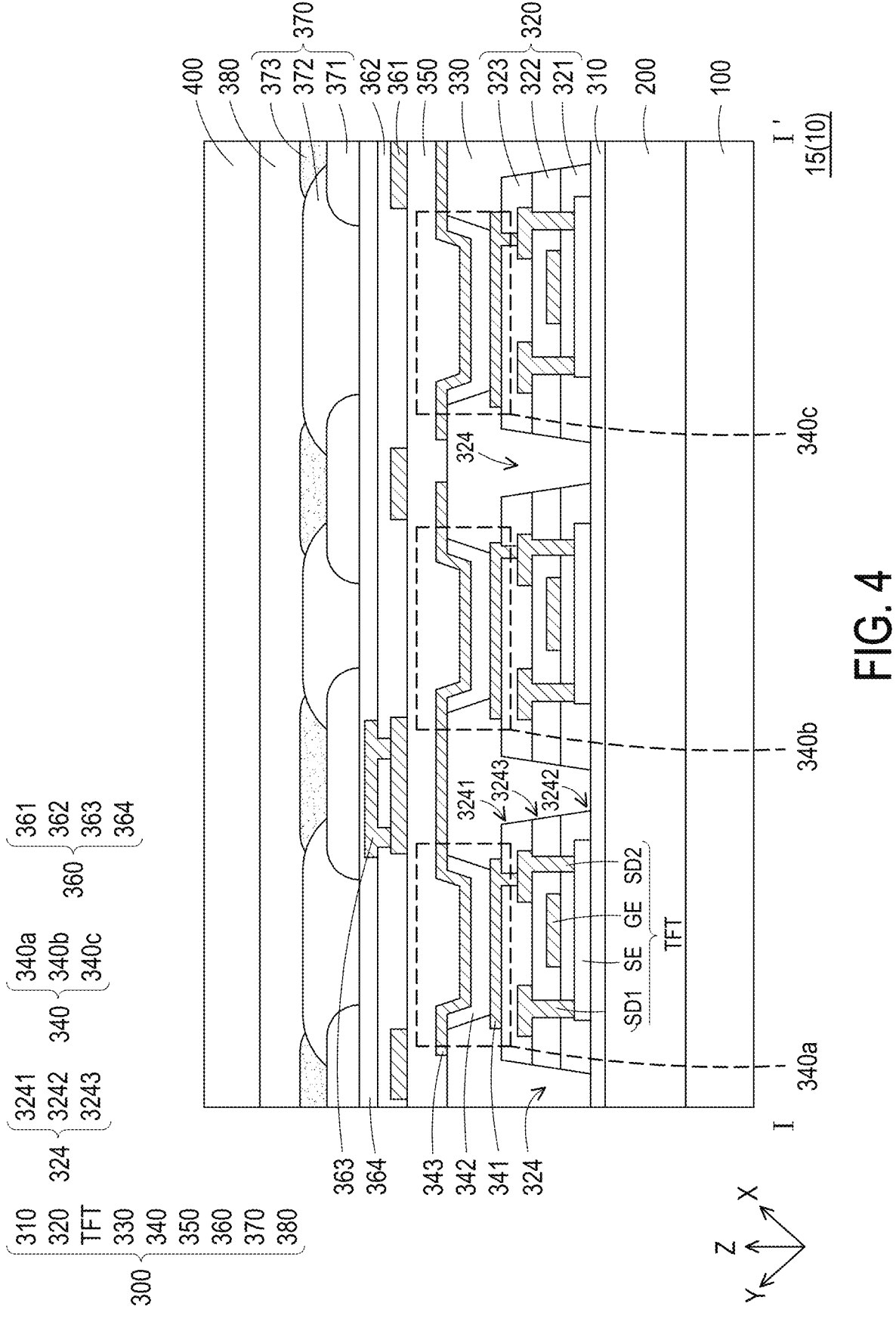
FIG. 4 is a schematic cross-sectional view of the rollable electronic device in FIG. 3 along a cross-section line I-I'.
Figure 5:
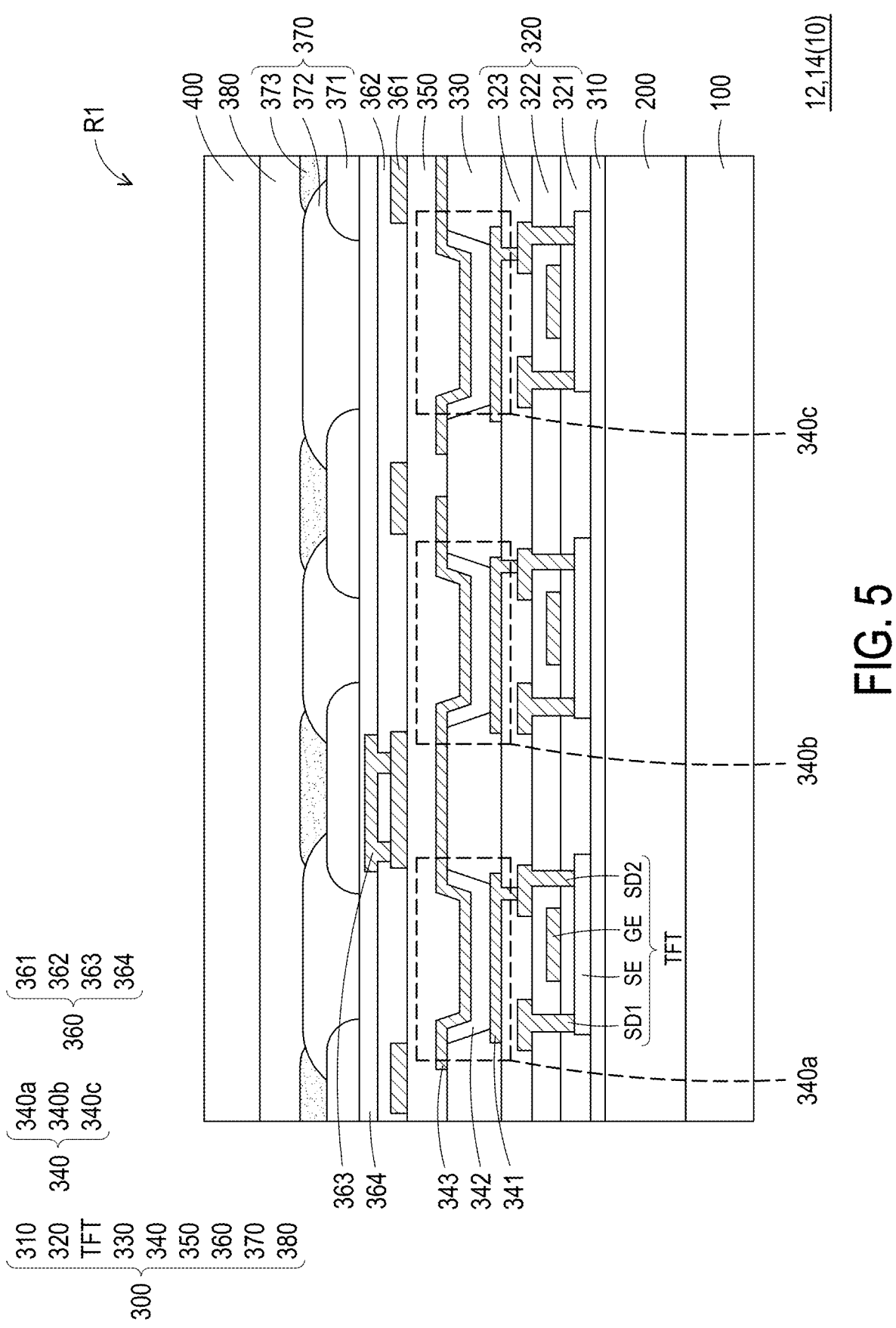
FIG. 5 is an enlarged schematic view of a region R1 of a flat region of the rollable electronic device in FIG. 2.
Figure 6:
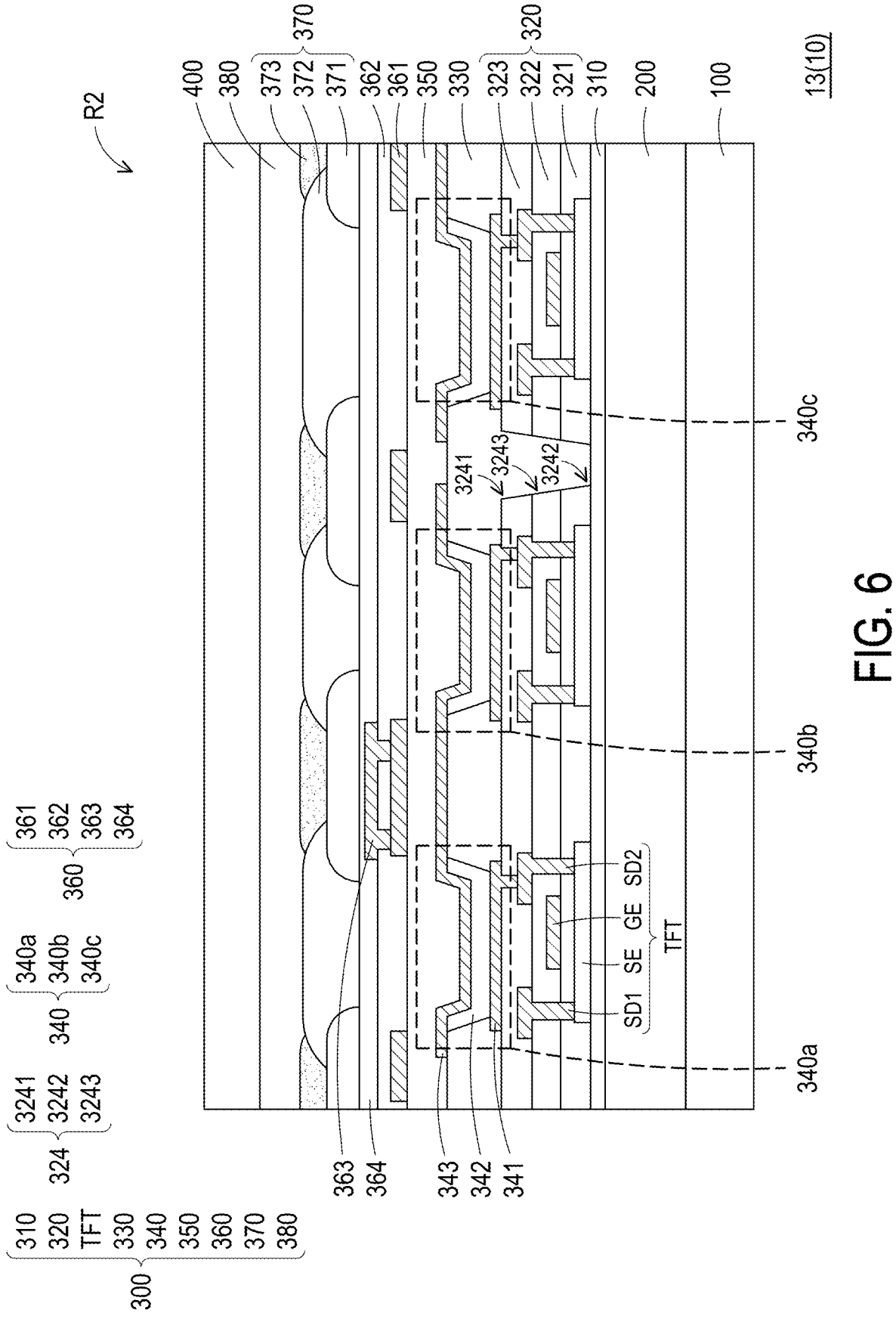
FIG. 6 is an enlarged schematic view of a region R2 of a foldable region of the rollable electronic device in FIG. 2.
Figure 7:
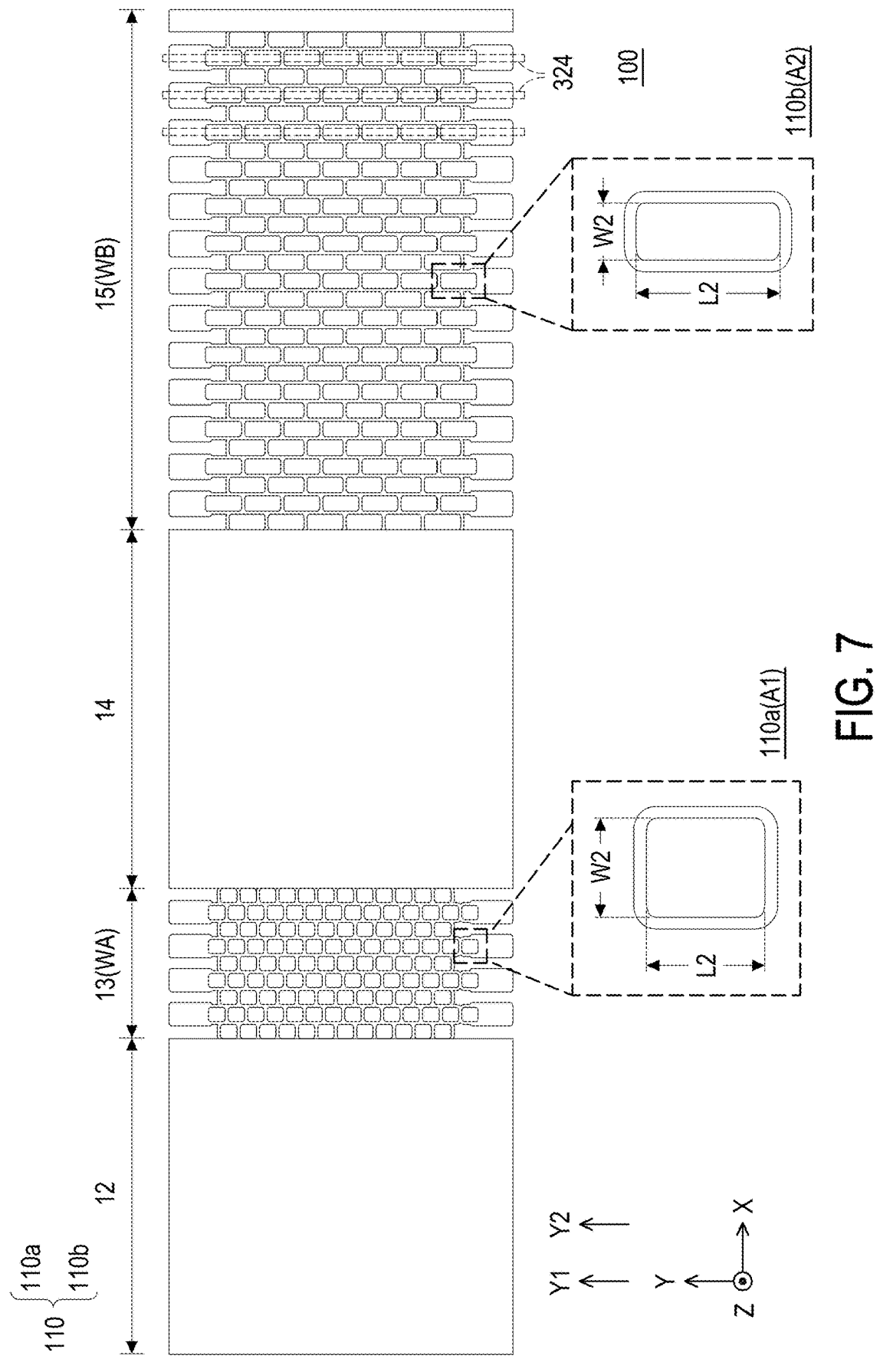
FIG. 7 is a schematic top view of a support layer of the rollable electronic device in FIG. 1 in a flat state.
Figure 8:
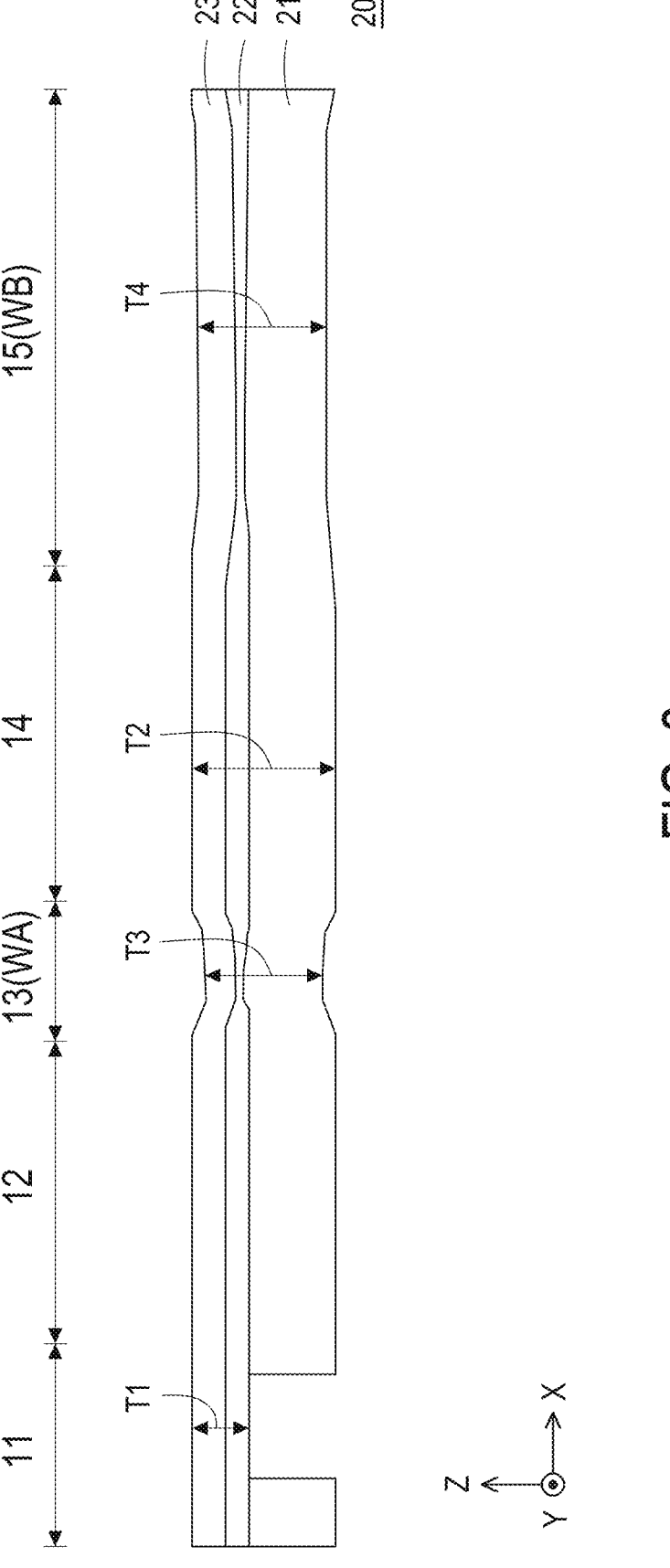
FIG. 8 is a cross-sectional view of a base layer of the rollable electronic device in FIG. 1 in the flat state.

FIG. 1 is a schematic top view of a rollable electronic device in different states according to the first embodiment of the disclosure. FIG. 2 is a schematic cross-sectional view of the rollable electronic device in FIG. 1 in the different states. FIG. 3 is a partial top view of a rollable region of the rollable electronic device in FIG. 1. FIG. 4 is a schematic cross-sectional view of the rollable electronic device in FIG. 3 along a cross-section line I-I'. FIG. 5 is an enlarged schematic view of a region R1 of a flat region of the rollable electronic device in FIG. 2. FIG. 6 is an enlarged schematic view of a region R2 of a foldable region of the rollable electronic device in FIG. 2. FIG. 7 is a schematic top view of a support layer of the rollable electronic device in FIG. 1 in a flat state. FIG. 8 is a cross-sectional view of a base layer of the rollable electronic device in FIG. 1 in the flat state. For clarity of the drawings and convenience of explanation, several elements in the rollable electronic device are omitted from FIG. 1, FIG. 2, FIG. 3, and FIG. 7.

Referring to FIG. 1, a rollable electronic device 10 of this embodiment has a display region AA and a peripheral region PA adjacent to the display region AA. The display region AA has a first side S1 and a second side S2 opposite to each other, and the first side S1 and the second side S2 are parallel to a direction X respectively.

Referring to FIG. 1 and FIG. 2, the rollable electronic device 10 of this embodiment can have different states, including a folded state (or an unextended state) I, an extending state II, and a flat state (or an extended state) III. In this embodiment, the rollable electronic device 10 can change the state thereof through a rollable axis RA. The rollable axis RA refers to an axis which can be rolled up or rolled out, so that the rollable electronic device 10 can change shape or size; or the rollable axis RA refers to the axis around which the object rolls. The rollable axis RA can extend along a direction Y.

Specifically, in the flat state III, the rollable electronic device 10 may include a bending region 11, a flat region 12, a foldable region 13, a flat region 14, and a rollable region 15 sequentially in the extending direction X.

When the rollable electronic device 10 is in the folded state I, in the normal direction Z of the rollable electronic device 10, the bending region 11 may be close to and overlap the rollable region 15, the flat region 12 may be close to and overlap the flat region 14, and the flat region 14 may overlap the rollable region 15. In addition, in the folded state I of the rollable electronic device 10, the curvature of the foldable region 13 may be smaller than the curvature of the rollable region 15, and the curvature of the bending region 11 may be smaller than the curvature of the foldable region 13. This design of the curvature can keep the panel stress within a tolerable range in different regions, thereby improving the tolerance of the panel when being used, but not limited thereto. The folded state I refers to the parallel state of two opposite parts, or refers to the final state of the rollable electronic device 10 after being folded by the user (or a state in which not being able to be bent further); the curvature may be calculated/measured when the rollable electronic device 10 is in the folded state I or may be obtained according to the specification of the rollable electronic device 10.

When the rollable axis RA moves along the extending direction X so that the rollable electronic device 10 is in the extending state II, in the normal direction Z of the rollable electronic device 10, the bending region 11 may not overlap the rollable region 15, and the flat region 14 may gradually not overlap the rollable region 15.

When the rollable axis RA continues to move along the extending direction X so that the rollable electronic device 10 is in the flat state III, in the normal direction Z of the rollable electronic device 10, the bending region 11 may be away from the rollable region 15, the flat region 12 may be away from the flat region 14, and the bending region 11, the flat region 12, the foldable region 13, the flat region 14, and the rollable region 15 may not overlap each other. In addition, in the flat state III of the rollable electronic device 10, the foldable region 13 may be closer to the bending region 11 than the rollable region 15 is to the bending region 11, and the bending region 11 and the rollable region 15 may be respectively positioned on opposite sides of the rollable electronic device 10. Since the rollable region 15 is away from the bending region 11, pulling on the bending region 11 can be avoided when the rollable electronic device 10 is rolled, which can reduce the risk of abnormal signal input and also reduce the difficulty of the assembly process.

In this embodiment, in the flat state III of the rollable electronic device 10, a width WA of the foldable region 13 may be smaller than a width WB of the rollable region 15, but not limited thereto. The width WA may be the width of the foldable region 13 measured along the direction X, and the width WB may be the width of the rollable region 15 measured along the direction X. This design can keep the panel stress within a tolerable range in different regions, thereby improving the tolerance of the panel when being used.

In this embodiment, during the transition process of the different states of the rollable electronic device 10 (including the folded state I, the extending state II, and the flat state III), the bending region 11 can be bent and fixed without sliding, the flat region 12 and the flat region 14 cannot be bent and cannot slide, the foldable region 13 can be bent without sliding, and the rollable region 15 can be bent and can slide.

In this embodiment, the direction X, the direction Y, and the normal direction Z are different directions respectively. The direction X is, for example, the movement direction of the rollable axis RA or the extending direction of the rollable electronic device 10, and the direction Y is, for example, the extending direction of the rollable axis RA. The direction X may be approximately perpendicular to the direction Y, and the normal direction Z may be approximately perpendicular to the direction X and the direction Y respectively. In this embodiment, "perpendicular" means that the angle between the two directions may be in a range of 80 degrees to 100 degrees, and "parallel" means that the angle between the two directions may be in a range of 0 degrees and 10 degrees.

Please continue to refer to FIG. 2. The rollable electronic device 10 of this embodiment may include a support layer 100, a base layer 200, a display layer 300, a cover layer 400, and a circuit board 500. The support layer 100 has a first surface 100a and a second surface 100b opposite to each other. A portion of the base layer 200 is disposed on the first surface 100a, and another portion of the base layer 200 is bent downward and is disposed under the second surface 100b. The display layer 300 is disposed on the base layer 200. The cover layer 400 is disposed on the display layer 300. The circuit board 500 is disposed under another portion of the base layer 200.

Referring to FIG. 3 to FIG. 6, the display layer 300 is disposed in the flat region 12, the foldable region 13, the flat region 14, and the rollable region 15. The display layer 300 may include a buffer layer 310, an insulating layer 320, a transistor TFT, an organic layer 330, a plurality of electronic units 340, a packaging layer 350, a sensing unit 360, an optical adjustment unit 370, and an optical layer 380.

Referring to FIG. 4 to FIG. 6, the buffer layer 310 is disposed on the base layer 200. The buffer layer 310 may be a single-layer structure or a multi-layer structure, and the material of the buffer layer 310 may include organic materials, inorganic materials, or a combination of the above, but not limited thereto.

Referring to FIG. 4 to FIG. 6, the insulating layer 320 is disposed on the base layer 200 and the buffer layer 310. In this embodiment, the material of the insulating layer 320 may include organic materials, inorganic materials, or a combination of the above, but not limited thereto. The insulating layer 320 includes a first layer 321, a second layer 322, a third layer 323, and a plurality of first trenches 324. The first layer 321 is disposed on the buffer layer 310, the second layer 322 is disposed on the first layer 321, and the third layer 323 is disposed on the second layer 322. The first trench 324 may be disposed between two adjacent electronic units 340 (or transistors TFT), but not limited thereto. The first trench 324 may pass through the first layer 321, the second layer 322, and the third layer 323, and the first trench 324 may expose a portion of the buffer layer 310, but not limited thereto. The first trench 324 has a top part 3241 and a bottom part 3242 opposite to each other and a side surface 3243. The bottom part 3242 is closer to the base layer 200 than the top part 3241 is to the base layer 200, and the side surface 3243 connects the top part 3241 and the bottom part 3242. In addition, in some unshown embodiments, in addition to the first trench passing through the first layer 321, the second layer 322, and the third layer 323 of the insulating layer 320, the first trench may also pass through the buffer layer 310 to expose a portion of the base layer 200.

Referring to FIG. 3, the plurality of first trenches 324 may extend from the first side S1 to the second side S2 of the display region AA. The outline shape of the plurality of first trenches 324 may be elongated, but not limited thereto. The plurality of first trenches 324 have a first longitudinal direction Y1, the first longitudinal direction Y1 may be parallel to the extending direction (the direction Y) of the rollable axis RA, and the first longitudinal direction Y1 may be perpendicular to the direction X. Two adjacent first trenches 324 may be overlapped with each other along the direction X perpendicular to the first longitudinal direction Y1. In this embodiment, "longitudinal direction" refers to the direction along or parallel to the major axis of the object; "major axis" refers to a straight line extending longitudinally through an object; for a long, narrow, or elliptical object, the major axis is close to the maximum longitudinal size; for objects that do not have a well-defined major axis, the major axis may represent the major axis of the smallest rectangle that can surround the object.

In this embodiment, since the first longitudinal direction Y1 of the plurality of first trenches 324 may be parallel to the extending direction (the direction Y) of the rollable axis RA and perpendicular to the direction X (the movement direction of the rollable axis RA or the extending direction of the rollable electronic device 10), and the two adjacent first trenches 324 may be overlapped with each other in the direction X, the probability of cracks or damage to the rollable electronic device 10 during extending can be reduced. In contrast, if the first longitudinal direction of the first trench is parallel to the movement direction of the rollable axis (or the extending direction of the rollable electronic device), or the two adjacent first trenches are not overlapped with each other in the movement direction of the rollable axis (or the extending direction of the rollable electronic device), cracks or damage to the rollable electronic device during extending is likely to occur. The cracks could extend from the non-overlapping region along the extending direction, resulting in a larger range of cracks. Designing at least two adjacent overlapping trenches can significantly reduce cracks and the expansion of cracks.

Referring to FIG. 3, at least one first trench 324 of the plurality of first trenches 324 has a first length L1 and a first width W1. In the top view in FIG. 3, the first length L1 may be, for example, the maximum length of the smallest rectangle around the first trench 324 measured along the direction Y parallel to the major axis direction, and the first width W1 may be, for example, the maximum width of the smallest rectangle around the first trench 324 measured along the direction X perpendicular to the major axis direction.

In this embodiment, the first length L1 of the first trench 324 may be greater than or equal to 0.1 mm and less than or equal to 100000 mm, greater than or equal to 1 mm and less than or equal to 10000 mm, greater than or equal to 10 mm and less than or equal to 1000 mm, but not limited thereto. When the first length L1 is too small (that is, when the first trench 324 does not extend from the first side S1 to the second side S2 of the display region AA), the risk of cracks in a portion of the region of the rollable electronic device 10 when extending is likely to occur. When the first length L1 is too large (that is, when the first trench 324 extends beyond the first side S1 and/or the second side S2 in the display region AA), the available space for layout of the wiring in the peripheral region PA is affected.

In this embodiment, the first width W1 of the first trench 324 may be greater than or equal to 0.01 μm and less than or equal to 1000 μm, greater than or equal to 0.1 μm and less than or equal to 100 μm, greater than or equal to 0.5 μm and less than or equal to equal to 10 μm, but not limited thereto. When the first width W1 is too small, producing the first trench by etching is difficult. When the first width W1 is too large, the available space for layout of the wiring in the display region AA is affected or the flatness of layers above the insulating layer 320 is affected.

In this embodiment, the first length L1 and the first width W1 of the first trench 324 can satisfy the following equation: $1 \times 10^3 < L1/W1 < 1 \times 10^7$, so as to reduce the probability of cracks in the rollable electronic device 10 during extending or to maximize the available space for layout of the wiring in the display region AA, but not limited thereto. In this embodiment, the first length L1 and the first width W1 of the first trench 324 can satisfy the following equation: $1 \times 10^3 \ \mu m^2 < L1 \times W1 < 1 \times 10^7 \ \mu m^2$, so as to reduce the probability of cracks in the rollable electronic device 10 during extending or to maximize the available space for layout of the wiring in the display region AA, but not limited thereto.

Referring to FIG. 4 to FIG. 6, in this embodiment, the first trench 324 may be disposed between the rollable region 15 shown in FIG. 4 (FIG. 4 schematically shows four first trenches 324, but not limited thereto) and the foldable region 13 shown in FIG. 6 (FIG. 6 schematically shows one first trench 324, but not limited thereto), and the first trench 324 is not disposed in the flat region 14 (or the flat region 12) shown in FIG. 5, but not limited thereto. In some embodiments, the first trenches 324 may also be disposed in the rollable region 15, the foldable region 13, and the flat region 14 (or the flat region 12) simultaneously, as long as the relationship between the area, the quantity, and the density of the first trenches between different regions can satisfy the following conditions: the quantity of the first trenches 324 in the rollable region 15 may be greater than the quantity of the first trenches 324 in the foldable region 13, and/or the density of the plurality of first trenches 324 in the rollable region 15 may be greater than the density of the plurality of first trenches 324 in the foldable region 13; in addition, when the flat region 14 (or the flat region 12) is disposed with the first trench, the quantity of the first trenches 324 in the rollable region 15 may be greater than the quantity of the first trenches in the flat region 14 (or the flat region 12), the density of the plurality of first trenches 324 in the rollable region 15 may be greater than the density of the plurality of first trenches in the flat region 14 (or the flat region 12), and/or the area of one of the plurality of first trenches 324 in the rollable region 15 may be larger than the area of another one of the plurality of first trenches in the flat region 14 (or the flat region 12). In this embodiment, "density" refers to the degree of density. For example, density refers to a value calculated from using a fixed area in a region as the denominator and the sum of the areas of all first trenches in the fixed area as the numerator, in which the size of the fixed areas between different regions are the same. This design can keep the panel stress within a tolerable range by designing different trench quantities/densities for the stress distribution corresponding to different regions, thereby improving the tolerance of the panel when being used.

The transistor TFT is disposed in the insulating layer 320. The transistor TFT may include a gate GE, a source SD1, a drain SD2, and a semiconductor SE. The semiconductor SE is disposed on the buffer layer 310, the gate GE is disposed on the first layer 321, and the source SD1 and the drain SD2 are disposed on the second layer 322. The transistor TFT may be electrically connected to the electronic unit 340.

In this embodiment, the material of the semiconductor SE may be low temperature polysilicon oxide (LTPO), but not limited thereto. In some embodiments, the material of the semiconductor may also include amorphous silicon (a-Si), polysilicon (such as low temperature polysilicon, LTPS, or low temperature polysilicon oxide, LTPO), germanium, compound semiconductors (such as gallium nitride, silicon carbide, gallium arsenide, gallium phosphide, indium phosphide, indium arsenide, and/or indium antimonide), alloy semiconductors (such as SiGe alloy, GaAsP alloy, AlInAs alloy, AlGaAs alloy, GaInAs alloy, GaInP alloy, GaInAsP alloy), metal oxides (such as indium gallium zinc oxide, IGZO; indium zinc oxide, IZO; and indium gallium zinc oxide, IGZTO), organic semiconductors containing polycyclic aromatic compounds, or a combination of the above.

In this embodiment, the form of the transistor TFT may be a top gate structure, but not limited thereto. In some embodiments, the form of the transistor TFT may also include a top gate structure and a double gate structure including a top gate structure and a bottom gate structure, in which the first trench may be disposed between different forms of the transistor TFT, for example, disposed between the top gate structure and the double gate structure, thereby reducing the possible risk of cracks or damage from the mismatched stress between different materials and different forms of the transistor TFT.

The organic layer 330 is disposed on the insulating layer 320 and in the first trench 324. The organic layer 330 may be a single-layer structure or a multi-layer structure, and the material of the organic layer 330 may include organic materials, but not limited thereto. The organic layer 330 may include an organic portion 332 disposed in the first trench 324, and the organic portion 332 may be a portion of the entire organic layer 330, but not limited thereto. In some embodiments, the organic portion may also be organic materials different from the organic layer 330, and is independently filled in at least one first trench of the plurality of first trenches one by one. In this embodiment, through the filling of the organic layer, the stability of the trench can be improved, so that the subsequent stacking is less likely to collapse.

The plurality of electronic units 340 (including electronic units 340a, electronic units 340b, and electronic units 340c) are disposed on the insulating layer 320. In the top view, at least one of the electronic units 340 (the electronic unit 340a, the electronic unit 340b, or the electronic unit 340c) may be disposed between two adjacent first trenches 324 of the plurality of first trenches 324 to reduce the stress between the electronic units. In this embodiment, "adjacent" means that there are no other identical components between two identical components.

In this embodiment, when the electronic unit 340 may be a light-emitting diode, the electronic unit 340 may include a first electrode 341, a light-emitting element 342, and a second electrode 343. The first electrode 341 is disposed on the insulating layer 320 and is electrically connected to the light-emitting element 342. The light-emitting element 342 is disposed on the first electrode 341. The second electrode 343 is disposed on the light-emitting element 342 and is electrically connected to the light-emitting element 342. The electronic unit 340 may be electrically connected to the drain SD2 of the transistor TFT through the first electrode 341.

In this embodiment, the electronic unit 340a, the electronic unit 340b, and the electronic unit 340c in the electronic unit 340 may respectively be, for example, light-emitting diodes that emit different colors, but not limited thereto. For example, the electronic unit 340a may be a red light-emitting diode, the electronic unit 340b may be a green light-emitting diode, and the electronic unit 340c may be a blue light-emitting diode, but not limited thereto. Although the electronic unit 340 in this embodiment may be a light-emitting diode, the disclosure does not limit the type of the electronic unit 340. In some embodiments, the electronic unit may also include passive elements or active elements, such as capacitors, resistors, inductors, diodes (including photodiodes or varactor diodes), or transistors, but not limited thereto.

The packaging layer 350 is disposed on the electronic unit 340, and the packaging layer 350 may cover a portion of the organic layer 330. The packaging layer 350 may be a single-layer structure or a multi-layer structure, and the material of the packaging layer 350 may include organic materials, inorganic materials, or a combination of the above, but not limited thereto.

The sensing unit 360 is disposed on the packaging layer 350. The sensing unit 360 may include a patterned metal layer 361, an insulating layer 362, a patterned metal layer 363, and an insulating layer 364. The patterned metal layer 361 is disposed on the packaging layer 350, the insulating layer 362 is disposed on the patterned metal layer 361, the patterned metal layer 363 is disposed on the insulating layer 362, and the insulating layer 364 is disposed on the patterned metal layer 363. In this embodiment, the sensing unit 360 may include touch sensing, biological sensing, distance sensing, and electromagnetic wave sensing, but not limited thereto. In addition, touch sensing may be used to sense touches of, for example, fingers, styluses, or external objects. In some embodiments, the rollable electronic device may include other sensing units (not shown) in addition to the sensing unit 360, in which the other sensing units may be disposed between the base layer 200 and the support layer 100, or disposed under the support layer 100.

The optical adjustment unit 370 is disposed on the sensing unit 360. The optical adjustment unit 370 may include a separation layer 371, a color filter layer 372, and a separation layer 373. The separation layer 371 and the color filter layer 372 are respectively disposed on the sensing unit 360. In the normal direction Z of the rollable electronic device 10, the separation layer 371 may be disposed without overlapping the corresponding electronic unit 340, and the color filter layer 372 may be disposed overlapping the corresponding electronic unit 340. The separation layer 373 is disposed on the separation layer 371, and in the normal direction Z of the rollable electronic device 10, the separation layer 373 may be disposed overlapping the corresponding separation layer 371. In this embodiment, the optical adjustment unit 370 may include, for example, color filter materials, quantum dot materials, or other materials that can adjust the spectrum of the light-emitting unit, but not limited thereto. In this embodiment, the separation layer 373 may be a light-shielding material. For example, the separation layer 373 may be a black matrix (BM), but not limited thereto.

The optical layer 380 is disposed on the optical adjustment unit 370. The optical layer 380 may include an anti-reflection layer, a polarizing layer, or a combination of the above, but not limited thereto.

The optical adjustment unit 370 may have optical designs individually adjusted for different electronic units; the optical layer 380 may have an optical design with an overall adjustment.

Please refer to FIG. 2 and FIG. 4 to FIG. 6, the support layer 100 is disposed in the flat region 12, the foldable region 13, the flat region 14 and the rollable region 15, and the support layer 100 is not disposed in the bending region 11. The support layer 100 may be disposed under the base layer 200.

Referring to FIG. 7, the support layer 100 may include a plurality of second trenches 110. In this embodiment, a second trench 110 may be disposed in the foldable region 13 and the rollable region 15, and the second trench 110 is not disposed in the flat region 12 or the flat region 14, but not limited thereto. The second trench 110 may pass through the support layer 100. The plurality of second trenches 110 have a second longitudinal direction Y2. The second longitudinal direction Y2 may be parallel to the first longitudinal direction Y1 and the direction Y, and the second longitudinal direction Y2 may be perpendicular to the direction X. This design of direction can provide both the supporting quality and the flexibility.

In this embodiment, one first trench 324 of the plurality of first trenches 324 may overlap a portion of second trenches 110 of the plurality of second trenches 110, so that the rollable electronic device 10 can release stress during extending, so as to reduce the probability of cracks or damage to the rollable electronic device 10 during extending. In some embodiments, the one first trench 324 of the plurality of first trenches 324 may overlap two or more second trenches 110 of the plurality of second trenches 110.

In this embodiment, since the second longitudinal direction Y2 of the plurality of second trenches 110 may be parallel to the first longitudinal direction Y1 and perpendicular to the direction X (the movement direction of the rollable axis RA or the extending direction of the rollable electronic device 10), and the portion of the plurality of second trenches 110 may overlap the first trench 324, the probability of cracks or damage to the rollable electronic device 10 during extending can be reduced, and the probability of the support layer 100 being deformed can be reduced. In contrast, if the second longitudinal direction of the second trench is parallel to the movement direction of the rollable axis (or the extending direction of the rollable electronic device), cracks or damage to the rollable electronic device during extending is likely to occur, and the support layer is likely to be deformed.

In this embodiment, at least one second trench 110 of the plurality of second trenches 110 has a second length L2 and a second width W2. In the top view of FIG. 7, the second length L2 may be, for example, the maximum length of the smallest rectangle around the second trench 110 measured along the direction Y parallel to the major axis direction, and the second width W2 may be, for example, the maximum width of the smallest rectangle around the second trench 110 measured along the direction X perpendicular to the major axis direction.

In this embodiment, the second length L2 of the second trench 110 may be greater than or equal to 1 mm and less than or equal to 10 mm, but not limited thereto. When the second length L2 is less than 1 mm, the flexibility of the support layer 100 is insufficient. When the second length L2 is greater than 10 mm, the support layer 100 is likely to be deformed.

In this embodiment, the second width W2 of the second trench 110 may be greater than or equal to 100 μm and less than or equal to 300 μm, but not limited thereto. When the second width W2 is less than 100 μm, the flexibility of the support layer 100 is insufficient. When the second width W2 is greater than 300 μm, the support layer 100 is likely to be deformed.

In this embodiment, the second length L2 and the second width W2 of the second trench 110 can satisfy the following equation: $3<L2/W2<100$, so that the support layer 100 can provide a good flexibility and supporting quality at the same time, but not limited thereto. In this embodiment, the second length L2 and the second width W2 of the second trench 110 can satisfy the following equation: $1\times10^5\ \mu m^2<L2\times W2<3\times10^6\ \mu m^2$, so that the support layer 100 can provide a good flexibility and supporting quality at the same time, but not limited thereto.

In this embodiment, the first length L1 of the first trench 324 and the second length L2 of the second trench 110 may satisfy the following equation: $L1>L2$, and/or $1<L1/L2\le1000$, but not limited thereto. In this embodiment, the first width W1 of the first trench 324 and the second width W2 of the second trench 110 may satisfy the following equation: $W2>W1$, and/or $10\le W2/W1\le3000$, but are not limited thereto. In this embodiment, the first length L1 of the first trench 324, the first width W1 of the first trench 324, the second length L2 of the second trench 110, and the second width W2 of the second trench 110 can satisfy the following equation: $10\le(L1/W1)/(L2/W2)\le3\times10^6$, but not limited thereto. The sizes of the first trench and the second trench comply with the relationship as above, which can reduce the stress of the overall device, thereby improving the reliability.

Referring to FIG. 7, in this embodiment, an area A1 of one second trench 110a of the plurality of second trenches 110 in the foldable region 13 may be different from an area A2 of another second trench 110b of the plurality of second trenches 110 in the rollable region 15. In this embodiment, the area A1 of the one second trench 110a of the plurality of second trenches 110 in the foldable region 13 may be larger than the area A2 of the other second trench 110b of the plurality of second trenches 110 in the rollable region 15, but not limited thereto. The trench design of the support layer can optimize the supporting quality and flexibility, thereby improving the reliability of the device during multiple times of bending and rolling.

Referring to FIG. 8, the base layer 200 may include a base 210, an adhesive layer 220, and a flexible substrate 230. The base 210 is disposed on the support layer 100, the adhesive layer 220 is disposed on the base 210, and the flexible substrate 230 is disposed on the adhesive layer 220. In this embodiment, the material of the base 210 may include polyimide (PI), polyethylene terephthalate (PET), other suitable base materials, or a combination of the above, but not limited thereto. The material of the flexible substrate 230 may include polyimide/silicon oxide/polyimide, other suitable flexible substrate materials, or a combination of the above, but not limited thereto.

In this embodiment, the base layer 200 may be disposed in the bending region 11, the flat region 12, the foldable region 13, the flat region 14, and the rollable region 15. The base layer 200 in the bending region 11 has a smallest thickness T1, the base layer 200 in the flat region 12 and the flat region 14 has a smallest thickness T2, the base layer 200 in the foldable region 13 has a smallest thickness T3, and the base layer 200 in the rollable region 15 has a smallest thickness T4. In this embodiment, the smallest thickness T2 may be greater than the smallest thickness T4, the smallest thickness T4 may be greater than the smallest thickness T3, and the smallest thickness T3 may be greater than the smallest thickness T1 (i.e., $T1<T3<T4<T2$). Through this design, the substrates (such as the flexible substrate 230 and the base 210) are not likely to separate after the entire rollable electronic device 10 has been rolled and bent multiple times, and unnecessary deformation due to stress does not occur, thereby the reliability can be improved, but not limited thereto. The smallest thickness T1, the smallest thickness T2, the smallest thickness T3, and the smallest thickness T4 may respectively be the smallest thickness of the bending region 11, the flat region 12 (or the flat region 14), the foldable region 13, and the rollable region 15 measured along the direction Y.

Other examples will be listed below as illustrations. It should be noted here that the following embodiments follow the reference numerals and part of the content of the previous embodiments, in which the same reference numerals are used to represent the same or similar elements, and descriptions of the same technical content are omitted. For descriptions related to the omitted part, reference may be made to the above-mentioned embodiments, and the details are not repeated in the following embodiments.

Figure 9:
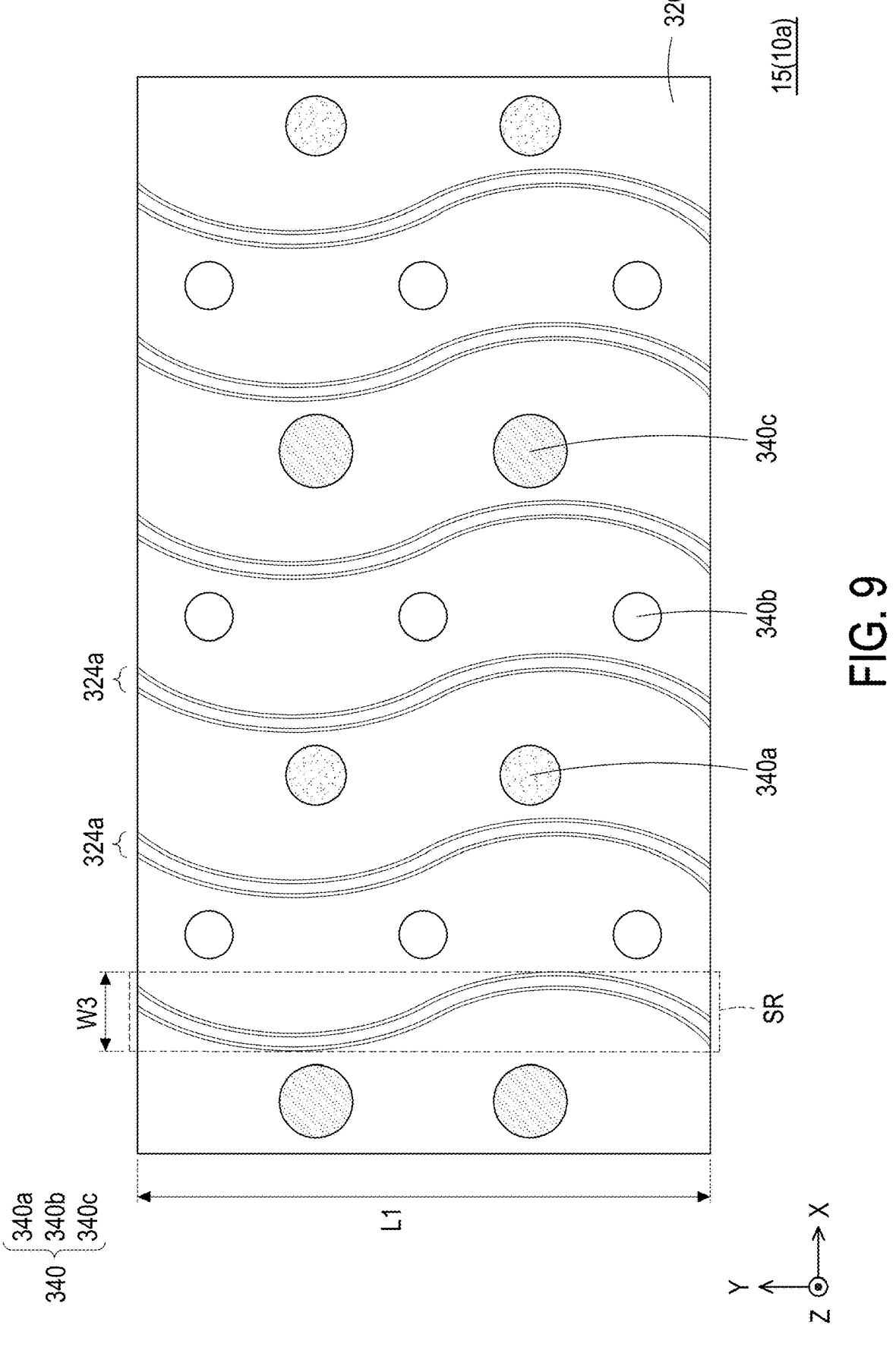
FIG. 9 is a partial top view of a rollable region of a rollable electronic device according to the second embodiment of the disclosure.

FIG. 9 is a partial top view of a rollable region of a rollable electronic device according to the second embodiment of the disclosure. Please refer to FIG. 3 together with FIG. 9. A rollable electronic device 10a of this embodiment is similar to the rollable electronic device 10 in FIG. 3. The difference between the two is merely that, in the rollable electronic device 10a of this embodiment, the outline shape of a plurality of first trenches 324a may be formed in an S-shape to improve the utilization flexibility of the available space for layout.

Specifically, referring to FIG. 9, at least one first trench 324a of the plurality of first trenches 324a has the first length L1 and a first width W3. In the top view in FIG. 9, the first length L1 may be, for example, the maximum length of a smallest rectangle SR around the first trench 324a measured along the direction Y parallel to the major axis direction, the first width W3 may be, for example, the maximum width of the smallest rectangle SR around the first trench 324a measured along the direction X perpendicular to the major axis direction.

Figure 10:
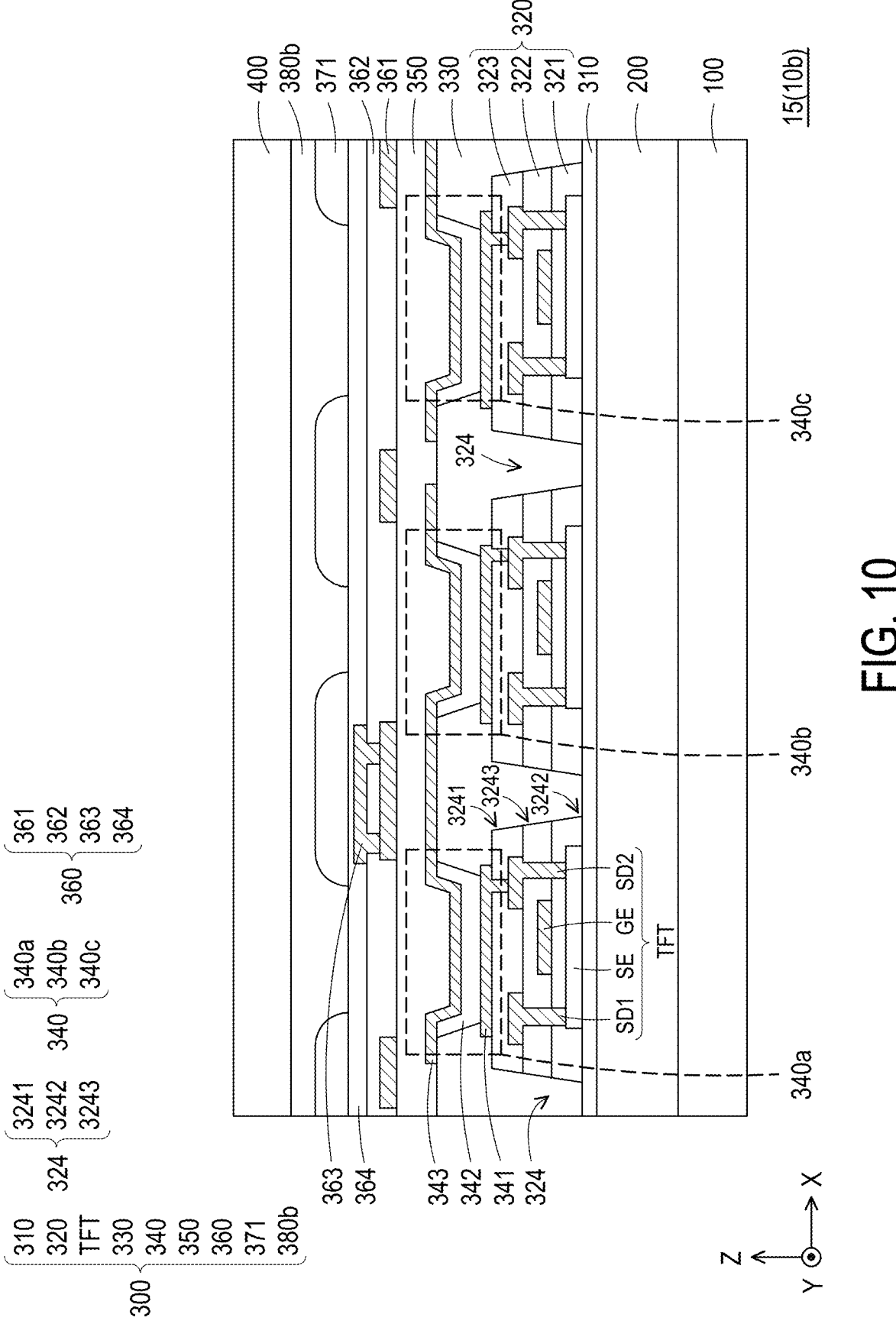
FIG. 10 is a schematic partial cross-sectional view of a rollable region of a rollable electronic device according to the third embodiment of the disclosure.

FIG. 10 is a schematic partial cross-sectional view of a rollable region of a rollable electronic device according to the third embodiment of the disclosure. Please refer to FIG. 4 together with FIG. 10. A rollable electronic device 10b of this embodiment is similar to the rollable electronic device 10 in FIG. 4. The difference between the two is merely that, in the rollable electronic device 10b of this embodiment, the color filter layer 372 and the separation layer 373 as shown in FIG. 4 may not be disposed according to requirements.

Specifically, referring to FIG. 10, the separation layer 371 is disposed on the sensing unit 360, and in the normal direction Z of the rollable electronic device 10b, the separation layer 371 may be disposed without overlapping the corresponding electronic unit 340. An optical layer 380b is disposed on the separation layer 371, and the optical layer 380b may cover a portion of the sensing unit 360.

Figure 11:
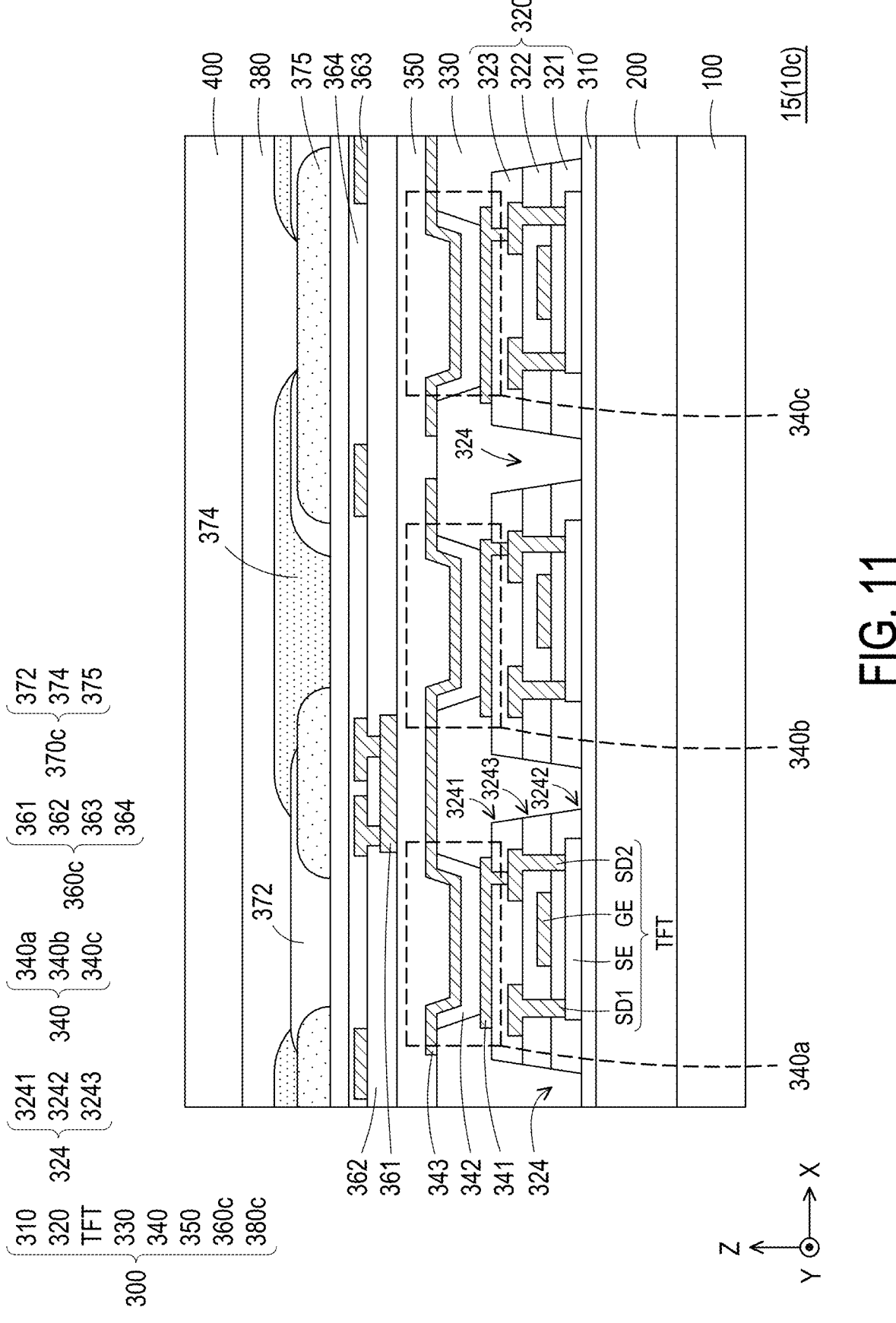
FIG. 11 is a schematic partial cross-sectional view of a rollable region of a rollable electronic device according to the fourth embodiment of the disclosure.

FIG. 11 is a schematic partial cross-sectional view of a rollable region of a rollable electronic device according to the fourth embodiment of the disclosure. Please refer to FIG. 4 together with FIG. 11. A rollable electronic device 10c of this embodiment is similar to the rollable electronic device 10 in FIG. 4. The difference between the two is merely that, in the rollable electronic device 10c of this embodiment, a sensing unit 360c with a different sensing mode from the sensing unit 360 in FIG. 4 may be disposed according to requirements, and an optical adjustment unit 370c different from the optical adjustment unit 370 (including the separation layer 371, the color filter layer 372, and the separation layer 373) in FIG. 4 may be disposed according to requirements.

Specifically, referring to FIG. 11, in this embodiment, the optical adjustment unit 370c may include the color filter layer 372, a color filter layer 374, and a color filter layer 375. In the normal direction Z of the rollable electronic device 10c, the overlap of at least two of the color filter layer 372, the color filter layer 374, and the color filter layer 375 can be regarded as a shielding structure to have a light-shielding effect.

Figure 12:
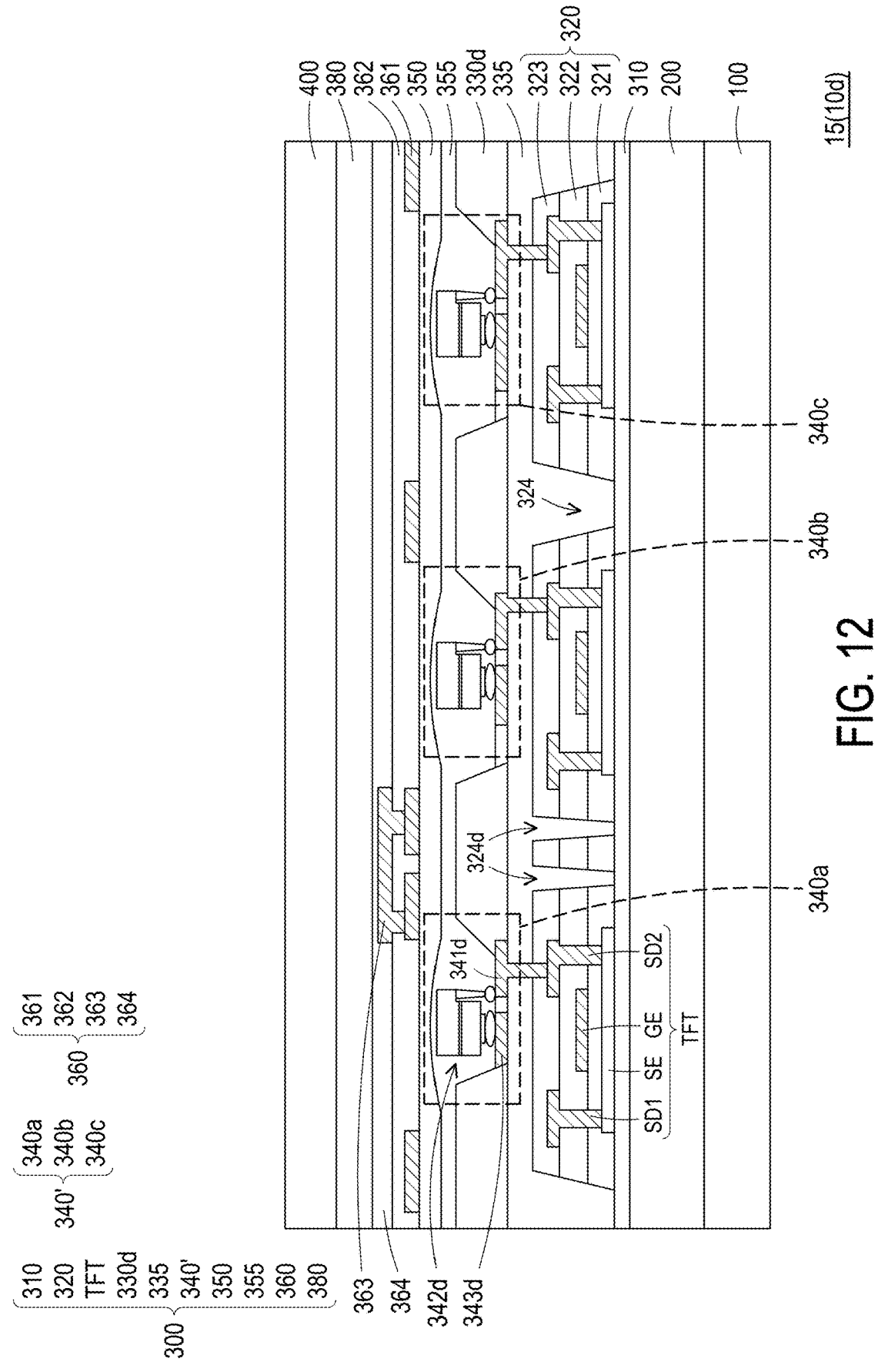
FIG. 12 is a schematic partial cross-sectional view of a rollable region of a rollable electronic device according to the fifth embodiment of the disclosure.

FIG. 12 is a schematic partial cross-sectional view of a rollable region of a rollable electronic device according to the fifth embodiment of the disclosure. Please refer to FIG. 11 together with FIG. 12. A rollable electronic device 10d of this embodiment is similar to the rollable electronic device 10c in FIG. 11. The difference between the two is merely that, in the rollable electronic device 10d of this embodiment, one first trench 324 or multiple first trenches 324d (schematically shown as two in FIG. 12, but not limited thereto) may be disposed between two adjacent electronic units 340' (or transistors TFT); the display layer 300 may further include an organic layer 335 and a glue layer 355; and an already produced light-emitting element 342d is used to replace the light-emitting element 342 in FIG. 11.

Specifically, referring to FIG. 12, for example, two first trenches 324d may be disposed between the electronic unit 340a and the electronic unit 340b in the electronic unit 340', and one first trench 324 may be disposed between the electronic unit 340b and the electronic unit 340c, and the width of the first trench 324d is different from the width of the first trench 324, but not limited thereto.

The organic layer 335 may be disposed on the insulating layer 320 and within the plurality of first trenches 324d. An organic layer 330d may be disposed on the organic layer 335. The electronic unit 340' may be disposed in an opening of the organic layer 330d exposing the organic layer 335.

In this embodiment, the electronic unit 340' may be a micro LED, but not limited thereto. The electronic unit 340' may include a first electrode 341d, the light-emitting element 342d, and a second electrode 343d. In this embodiment, the first electrode 341d and the second electrode 343d are disposed on the organic layer 335. The light-emitting element 342d is disposed on the first electrode 341d and the second electrode 343d. The electronic unit 340' may be electrically connected to the drain SD2 of the transistor TFT through the first electrode 341d.

In addition, unlike the method in FIG. 11 where the light-emitting element 342 is directly produced on the first electrode 341, this embodiment uses an indirect transfer method to transfer and bond the already produced light-emitting element 342d to the first electrode 341d and the second electrode 343d.

The glue layer 355 may be disposed on the organic layer 330d and the plurality of electronic units 340', and the glue layer 355 may cover the organic layer 330d and fill the opening of the organic layer 330d exposing the organic layer 335. The packaging layer 350 may be disposed on the glue layer 355.

Figure 13:
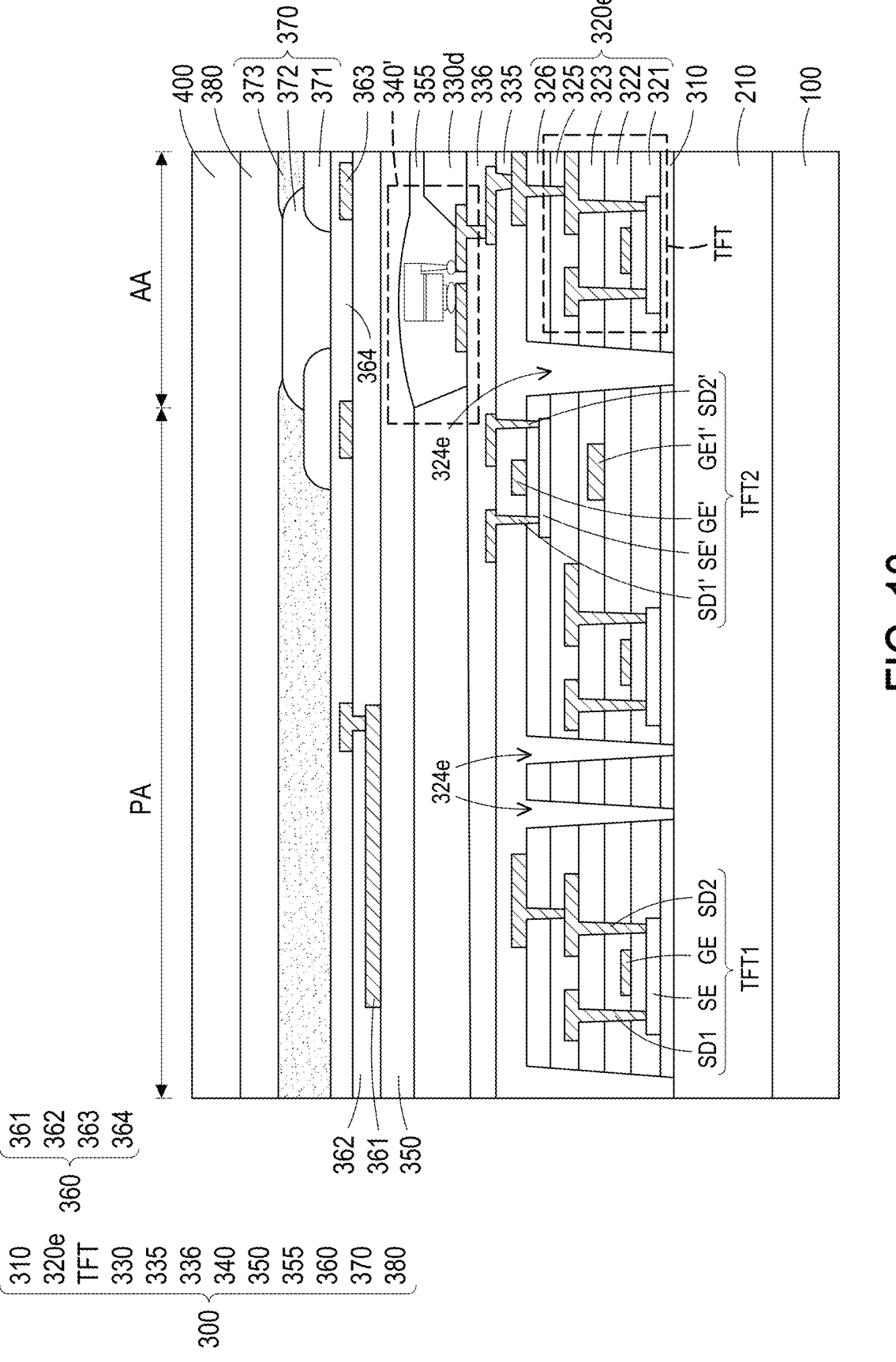
FIG. 13 is a schematic partial cross-sectional view of a peripheral region of a rollable electronic device according to the sixth embodiment of the disclosure.

FIG. 13 is a schematic partial cross-sectional view of a peripheral region of a rollable electronic device according to the sixth embodiment of the disclosure. Please refer to FIG. 12 together with FIG. 13. A rollable electronic device 10e of this embodiment is similar to the rollable electronic device 10d in FIG. 12. The difference between the two is merely that, in the rollable electronic device 10e of this embodiment, the peripheral region PA (or the bending region 11) may be disposed with a first trench 324e and a transistor TFT1 with a top gate structure; the display region AA may be disposed with a transistor TFT2 with a double gate structure; the insulating layer 320e further includes a fourth layer 325 and a fifth layer 326; the rollable electronic device 10e may further include the optical adjustment unit 370 and an organic layer 336.

Specifically, referring to FIG. 13, the optical adjustment unit 370 is disposed on the sensing unit 360. The organic layer 336 is disposed between the organic layer 330d and the organic layer 335. The fourth layer 325 is disposed on the third layer 323, and the fifth layer 326 is disposed on the fourth layer 325.

The transistor TFT2 may include a gate GE', a source SD1', a drain SD2', a semiconductor SE', and a gate GE1'. The gate GE1' is disposed on the second layer 322, the semiconductor SE' is disposed on the fourth layer 325, the gate GE' is disposed on the fifth layer 326, and the source SD1' and the drain SD2' are disposed on the organic layer 335.

In this embodiment, one or more first trenches 324e may be disposed between two adjacent transistors. For example, two first trenches 324e may be disposed between two adjacent transistors TFT1 in the peripheral region PA, and one first trench 324e may be disposed between two adjacent transistors in the display region AA and the peripheral region PA (for example, between the transistor TFT2 and the transistor TFT), but not limited thereto.

In this embodiment, through disposing the first trench 324e in the peripheral region PA (for example, the first trench 324e between the two adjacent transistors TFT1 in the peripheral region PA), damage to the circuit in the peripheral region PA due to the rolling process (or the extending process) of the rollable electronic device 10d can be further reduced, so that the rollable electronic device 10d can still have a good reliability after multiple times of extending.

In this embodiment, if there is enough space, the stress can be effectively reduced by disposing multiple first trenches (for example, the two first trenches 324e between the two adjacent transistors TFT1 in the peripheral region PA).

In this embodiment, the material of the semiconductor SE of the transistor TFT1 in the peripheral region PA may be LTPS, the material of the semiconductor SE of the transistor TFT in the display region AA may be LTPO, and the material of the semiconductor SE' of the transistor TFT2 in the display region AA may be IGZO, but not limited thereto. In some embodiments, the material of the semiconductor may also include amorphous silicon (a-Si), polysilicon (such as low temperature polysilicon, LTPS or low temperature polysilicon oxide, LTPO), germanium, compound semiconductors (such as gallium nitride, silicon carbide, gallium arsenide, gallium phosphide, indium phosphide, indium arsenide, and/or indium antimonide), alloy semiconductors (such as SiGe alloy, GaAsP alloy, AlInAs alloy, AlGaAs alloy, GaInAs alloy, GaInP alloy, GaInAsP alloy), metal oxides (such as indium gallium zinc oxide, IGZO); indium zinc oxide, IZO; and indium gallium zinc oxide, IGZTO), organic semiconductors containing polycyclic aromatic compounds, or a combination of the above.

In this embodiment, the first trench 324*e* may also be disposed between transistors of different forms, for example, the first trench 324*e* is disposed between the transistor TFT2 (the double gate structure) and the transistor TFT (the top gate structure), thereby reducing the possible risk of cracks or damage from the mismatched stress between different materials and different forms of the transistor TFT.

In summary, in the rollable electronic device according to the embodiments of the disclosure, since the first longitudinal direction of the first trench may be parallel to the extending direction (the direction Y) of the rollable axis and perpendicular to the direction X (the movement direction of the rollable axis or the extending direction of the rollable electronic device), and the two adjacent first trenches may be overlapped with each other in the direction X, the probability of cracks or damage to the rollable electronic device 10 during extending can be reduced. Since the second longitudinal direction of the second trench may be parallel to the first longitudinal direction and perpendicular to the direction X, and a portion of the plurality of second trenches 110 may overlap the first trench 324, the probability of cracks or damage to the rollable electronic device 10 during extending can be reduced, and the probability of deformation of the support layer can be reduced.

Finally, it should be noted that, the above embodiments are merely used to illustrate the technical solution of the disclosure, by the embodiments are not to limit the disclosure. Although the disclosure has been described in detail with reference to the embodiments, persons having ordinary skill in the art should understand that, the technical solutions recorded in the above-mentioned embodiments can still be modified, or to make equivalent substitutions for part of or all of the technical features. However, these modifications or substitutions do not make the essence of the corresponding technical solutions depart from the scope of the technical solutions disclosed according to the embodiments of the disclosure.

What is claimed is:

1. A rollable electronic device with a rollable axis, comprising:

a base layer;

an insulating layer disposed on the base layer and comprising a plurality of first trenches, wherein the plurality of first trenches have a first longitudinal direction parallel to the rollable axis; and one or more electronic units disposed on the insulating layer;

wherein in a top view, at least one of the electronic units is disposed between two adjacent first trenches of the plurality of first trenches, and the two adjacent first trenches are overlapped with each other along a direction perpendicular to the first longitudinal direction, wherein the rollable electronic device comprises a rollable region and a flat region, and an area of one of the plurality of first trenches in the rollable region is larger than an area of another one of the plurality of first trenches in the flat region.

2. The rollable electronic device as claimed in claim 1, further comprising:

a support layer disposed under the base layer and comprising a plurality of second trenches, wherein the plurality of second trenches have a second longitudinal direction parallel to the first longitudinal direction, and one of the plurality of first trenches overlaps a portion of the plurality of second trenches.

3. The rollable electronic device as claimed in claim 1, wherein at least one of the plurality of first trenches has a first length L1 and a first width W1, and a first ratio R1 of the first length L1 to the first width W1 satisfies the following equation: $1 \times 10^3 < R1 < 1 \times 10^7$.

4. The rollable electronic device as claimed in claim 1, wherein at least one of the plurality of first trenches has a first length L1 and a first width W1, and the first length L1 and the first width W1 satisfy the following equation: $1 \times 10^3$ $\mu m^2 < L1 \times W1 < 1 \times 10^7$ $\mu m^2$.

5. The rollable electronic device as claimed in claim 1, further comprising:

a support layer disposed under the base layer and comprising a plurality of second trenches, wherein the plurality of second trenches have a second longitudinal direction parallel to the first longitudinal direction, at least one of the plurality of second trenches has a second length L2 and a second width W2, and a second ratio R2 of the second length L2 to the second width W2 satisfies the following equation: $3 < R2 < 100$.

6. The rollable electronic device as claimed in claim 1, further comprising:

a support layer disposed under the base layer and comprising a plurality of second trenches, wherein the plurality of second trenches have a second longitudinal direction parallel to the first longitudinal direction, at least one of the plurality of second trenches has a second length L2 and a second width W2, and the second length L2 and the second width W2 satisfy the following equation: $1 \times 10^5$ $\mu m^2 < L2 \times W2 < 3 \times 10^6$ $\mu m^2$.

7. The rollable electronic device as claimed in claim 1, further comprising:

a support layer disposed under the base layer and comprising a plurality of second trenches, wherein the plurality of second trenches have a second longitudinal direction parallel to the first longitudinal direction, at least one of the plurality of first trenches has a first length L1, at least one of the plurality of second trenches has a second length L2, and the first length L1 and the second length L2 satisfy the following equation: L1>L2.

8. The rollable electronic device as claimed in claim 7, wherein the first length L1 and the second length L2 satisfy the following equation: $1 < L1/L2 \leq 1000$.

9. The rollable electronic device as claimed in claim 1, further comprising:

a support layer disposed under the base layer and comprising a plurality of second trenches, wherein the plurality of second trenches have a second longitudinal direction parallel to the first longitudinal direction, at least one of the plurality of first trenches has a first width W1, at least one of the plurality of second trenches has a second width W2, and the first width W1 and the second width W2 satisfy the following equation: W2>W1.

10. The rollable electronic device as claimed in claim 9, wherein the first width W1 and the second width W2 satisfy the following equation: $10 \leq W2/W1 \leq 3000$.

11. The rollable electronic device as claimed in claim 1, further comprising:

a support layer disposed under the base layer and comprising a plurality of second trenches, wherein the plurality of second trenches have a second longitudinal direction parallel to the first longitudinal direction, at least one of the plurality of first trenches has a first length L1 and a first width W1, at least one of the plurality of second trenches has a second length L2 and a second width W2, and the first length L1, the second length L2, the first width W1, and the second width W2 satisfy the following equation: $10 \leq (L1/W1)/(L2/W2) \leq 3 \times 10^6$.

12. The rollable electronic device as claimed in claim 1, wherein the rollable electronic device comprises a foldable region, and a quantity of the plurality of first trenches in the rollable region is greater than a quantity of the plurality of first trenches in the foldable region.

13. The rollable electronic device as claimed in claim 1, wherein the rollable electronic device comprises a foldable region, and a density of the plurality of first trenches in the rollable region is greater than a density of the plurality of first trenches in the foldable region.

14. The rollable electronic device as claimed in claim 1, further comprising:

a support layer disposed under the base layer and comprising a plurality of second trenches, wherein the plurality of second trenches have a second longitudinal direction parallel to the first longitudinal direction, the rollable electronic device comprises a foldable region, and an area of one of the plurality of second trenches in the foldable region is different from an area of another one of the plurality of second trenches in the rollable region.

15. The rollable electronic device as claimed in claim 14, wherein the area of the one of the plurality of second trenches in the foldable region is larger than the area of the other one of the plurality of second trenches in the rollable region.

16. The rollable electronic device as claimed in claim 1, wherein the rollable electronic device comprises a foldable region, and a width of the foldable region is smaller than a width of the rollable region.

17. The rollable electronic device as claimed in claim 1, wherein the rollable electronic device comprises a foldable region, and a curvature of the foldable region is smaller than a curvature of the rollable region in response to the rollable electronic device being in a folded state.

18. The rollable electronic device as claimed in claim 1, wherein the rollable electronic device comprises a foldable region and a bending region, and the foldable region is closer to the bending region than the rollable region is to the bending region in response to the rollable electronic device being in a flat state.

19. The rollable electronic device as claimed in claim 1, further comprising:

an organic portion disposed in at least one of the plurality of first trenches.

\* \* \* \* \*